US011869532B2

(12) United States Patent
Kim et al.

(10) Patent No.: US 11,869,532 B2
(45) Date of Patent: Jan. 9, 2024

(54) SYSTEM AND METHOD FOR CONTROLLING EMERGENCY BELL BASED ON SOUND

(71) Applicant: KOREA PHOTONICS TECHNOLOGY INSTITUTE, Gwangju (KR)

(72) Inventors: Seon Man Kim, Gwangju (KR); Kwang Hoon Lee, Anyang-si (KR); Hoe Min Kim, Gwangju (KR); Sung Kuk Chun, Gwangju (KR); Seon Kyu Yoon, Gwangju (KR); Jin Su Lee, Gwangju (KR)

( * ) Notice: Subject to any disclaimer, the term of this patent is extended or adjusted under 35 U.S.C. 154(b) by 146 days.

(21) Appl. No.: 17/514,460

(22) Filed: Oct. 29, 2021

(65) Prior Publication Data

US 2022/0148616 A1 May 12, 2022

(30) Foreign Application Priority Data

Nov. 12, 2020 (KR) ........................ 10-2020-0151086

(51) Int. Cl.
*G10L 25/51* (2013.01)
*G10L 25/30* (2013.01)
(Continued)

(52) U.S. Cl.
CPC ................ *G10L 25/51* (2013.01); *G08B 3/00* (2013.01); *G08B 23/00* (2013.01); *G08B 25/00* (2013.01); *G10L 25/30* (2013.01)

(58) Field of Classification Search
CPC ........................................................ G10L 25/51
See application file for complete search history.

(56) References Cited

U.S. PATENT DOCUMENTS 8,666,031 B2 * 3/2014 Rowe ..................... H04M 11/04 379/49
2007/0183604 A1 * 8/2007 Araki ..................... G10L 17/26 381/17

(Continued)

FOREIGN PATENT DOCUMENTS

KR 10-2018-0093596 8/2018
KR 10-2019-0118431 10/2019

(Continued)

OTHER PUBLICATIONS

English Specification of 10-2018-0093596.
English Specification of 10-2019-0118431.
English Specification of 10-2148378.

*Primary Examiner* — Olisa Anwah
(74) *Attorney, Agent, or Firm* — ANTONIO HA & U.S. PATENT, LLC

(57) ABSTRACT

According to an embodiment of the disclosure, a system for controlling an emergency bell based on sound comprises an emergency bell device installed in a crime area, gathering sound information generated in the crime area, detecting an emergency event from the gathered sound information, and generating an emergency bell operation signal, an analysis server receiving, in real-time, the sound information from the emergency bell device if the emergency bell operation signal is received, classifying per-time key sound sources in the sound information, and providing a situation analysis result on whether a crime occurs using the classified per-time key sound sources, and a control server receiving the situation analysis result and providing on-site dispatch information or situation response information to a security terminal in charge of the crime area based on the received situation analysis result.

6 Claims, 10 Drawing Sheets

(51) Int. Cl.

| | |
|---|---|
| ***G08B 23/00*** | (2006.01) |
| ***G08B 25/00*** | (2006.01) |
| ***G08B 3/00*** | (2006.01) |

(56) References Cited

U.S. PATENT DOCUMENTS

| | | | | |
|---|---|---|---|---|
| 2017/0103776 | A1* | 4/2017 | Kim | G10L 25/24 |
| 2018/0053394 | A1* | 2/2018 | Gersten | H04N 9/8205 |
| 2018/0293864 | A1* | 10/2018 | Wedig | G08B 25/08 |
| 2019/0180735 | A1* | 6/2019 | McElhaney | G10L 15/02 |
| 2019/0259378 | A1* | 8/2019 | Khadloya | G06N 20/10 |
| 2020/0118418 | A1* | 4/2020 | Benjamin | G08B 25/016 |
| 2020/0120199 | A1 | 4/2020 | Maeng et al. | |
| 2020/0302951 | A1* | 9/2020 | Deng | G08B 1/08 |
| 2021/0097827 | A1* | 4/2021 | Tylman | G08B 25/016 |
| 2021/0352460 | A1* | 11/2021 | Rohde | G06F 40/42 |
| 2022/0319303 | A1* | 10/2022 | Raucher | G08B 26/007 |
| 2022/0358953 | A1* | 11/2022 | Mishima | G10L 15/063 |

FOREIGN PATENT DOCUMENTS

| | | |
|---|---|---|
| KR | 10-2148378 | 8/2020 |
| WO | 2019-166296 | 9/2019 |

* cited by examiner

FIG. 8

| after enhancement | classification criteria | target dispatch time |
|---|---|---|
| Code 0 | Child crimes or violent crimes<br>e.g., when a man forces a woman into the car or when a woman screams and hangs up the phone | within the shortest time |
| Code 1 | Imminent or ongoing threat to life or immediately after threat to life, or current offender<br>e.g., when a stranger tries to open the door | within the shortest time |
| Code 2 | potential threat to life or need for crime prevention<br>e.g., when patron is drunk and not responding or when suspicious of forced entr | emergency report dispatch ASAP |
| Code 3 | immediate on-site measure unnecessary, but investigation or professional consultation is required<br>e.g., ring was gone unnoticed, or under hospital treatment after getting assaulted | within working time on the day |
| Code 4 | non-emergent complaints or reports | transfer to other organizations |

SYSTEM AND METHOD FOR CONTROLLING EMERGENCY BELL BASED ON SOUND

CROSS-REFERENCE TO RELATED APPLICATION(S)

This application is based on and claims priority under 35 U.S.C. 119 to Korean Patent Application No. 10-2020-0151086, filed on Nov. 12, 2020, in the Korean Intellectual Property Office, the disclosure of which is herein incorporated by reference in its entirety.

TECHNICAL FIELD

The disclosure relates to a sound-based emergency bell control system and method for analyzing an on-site situation based on sound information when an emergency bell is operated, quickly and accurately responding to a crime.

DESCRIPTION OF RELATED ART

The description of the Discussion of Related Art section merely provides information that may be relevant to embodiments of the disclosure but should not be appreciated as necessarily constituting the prior art.

In general, an anti-crime system is installed in a less secure area to report and respond to an emergency situation, such as violence or emergency. Among anti-crime systems, a security emergency bell is installed in a specific area, such as a crime area (also referred to as a crime-ridden area) and transmits a signal to a specific server to request help according to the user's operation, so that the manager may detect dangerous situations.

A surveillance camera may be installed with such a security emergency bell to capture or record a dangerous situation or crime to help the manager to identify the captured image or video or to search for criminals. The surveillance camera generally adopts a closed circuit television (CCTV) or a high-performance camera.

Recently, as crimes, such as assault, robbery, sexual harassment or murder, frequently occur in indoor public places, such as bathrooms, anxiety increases among users using such public places. In particular, women with poor physical ability compared to men have greater anxiety and burden in use of indoor public spaces.

Accordingly, various studies on emergency alarm devices for preventing and coping with emergencies in indoor public places have been conducted. Emergency bells for crime prevention are being installed in actual sites due to the advantages of simple installation and convenient operation. However, to operate the emergency bell, a person in an emergency situation needs to move to the position where the emergency bell is installed and press the emergency bell by physical contact. However, it is difficult for the person in an actual emergency to press the emergency bell before the criminal, and the operation of the emergency bell may be forcibly stopped. As such, the conventional emergency bell cannot quickly respond to an emergency situation.

To address such issues, sound-based security systems have been studied which detect an emergency by comparing the decibel level of the sound signal collected by the microphone to a threshold. However, these systems respond to sounds irrelevant to an emergency and thus suffer from malfunctions, frequent errors, and low reliability.

FIG. 1 is a flowchart illustrating a method for recognizing a crime situation based on sound according to the prior art.

Referring to FIG. 1, in the case where a sound recognition module is installed in an emergency bell device to which sound-based security technology is applied, the sound recognition module mainly gathers non-verbal sounds (warning sounds, screams, cries, ambient sounds, animal sounds, etc.) and then detects only a specific event sound (e.g., glass breaking sound) and provides an alarm (e.g., notification for glass breaking) corresponding to the occurrence of the event. The emergency bell device including such a sound recognition module has a disadvantage in that the detection rate is lowered because the voice cannot be accurately recognized due to the noise in the indoor public place.

Recent emergency bell devices installed in indoor public places adopt both button-type emergency bells and sound recognition modules. However, their frequent malfunctions lead to unnecessary dispatch of security persons to the site, wasting manpower.

In statistics, about 99.3% of the calls through the emergency bell device were caused by drunkards or noise or prank or mistake calls.

FIG. 2 is a flowchart illustrating a crime response process based on an emergency bell device according to the prior art.

Referring to FIG. 2, if an emergency occurs (S11), an emergency bell is operated, and a system that manages the emergency bell device in the corresponding area detects the emergency (S12). The system dispatches first responders to the site (S13), and the first responders investigate the site (S14) and reports the result to the system. If a crime is recognized from the report, the system dispatches additional responders to the site (S15). The first responders and additional responders deal with the crime situation (S16).

However, this approach renders it difficult to quickly respond to a crime.

SUMMARY

To address the foregoing issues, according to embodiments of the disclosure, there is provided a method and system that may reduce burdens, due to time, costs, or mental fatigue, which may arise as initial responders are first dispatched when an emergency occurs and, then, more responds are dispatched depending on severity of the situation, and allow for early recognition and effective response to any emergency.

However, the objects of the embodiments are not limited thereto, and other objects may also be present.

According to an embodiment of the disclosure, a system for controlling an emergency bell based on sound comprises an emergency bell device installed in a crime area, gathering sound information generated in the crime area, detecting an emergency event from the gathered sound information, and generating an emergency bell operation signal, an analysis server receiving, in real-time, the sound information from the emergency bell device if the emergency bell operation signal is received, classifying per-time key sound sources in the sound information, and providing a situation analysis result on whether a crime occurs using the classified per-time key sound sources, and a control server receiving the situation analysis result and providing on-site dispatch information or situation response information to a security terminal in charge of the crime area based on the received situation analysis result.

According to an embodiment of the disclosure, the emergency bell device may have unique identification information designated by the control server. The emergency bell operation signal and the situation analysis result may include the identification information for the emergency bell device.

According to an embodiment of the disclosure, the analysis server may store information for the security terminal. The analysis server may fetch the information for the security terminal using the identification information for the emergency bell device included in the situation analysis result and transmit the on-site dispatch information or the situation response information.

According to an embodiment of the disclosure, the emergency bell device may include at least one camera device capturing an on-site image of the crime area. The control server may classify the on-site situation into a preset security level for each time using the captured on-site image received through the camera device and the situation analysis result and generate the on-site dispatch information or the situation response information according to the classified security level.

According to an embodiment of the disclosure, the analysis server may perform an artificial intelligence-based sound analysis algorithm that extracts an effective feature including a correlation in a time-frequency domain for the sound information having time series characteristics, classifies at least one key sound source based on the extracted effective feature using a convolutional neural network (CNN), and predicts the situation analysis result for the on-site situation using the classified key sound sources.

According to an embodiment of the disclosure, the artificial intelligence-based sound analysis algorithm may include a data gathering module gathering a number of sample sound sources for each crime situation and stores them as a dataset for training, a training module pre-processing the sample sound sources, extracting an auditory characteristic, as a feature vector, from the pre-processed data, and generating and training a classifier for classifying the key sound sources for each crime situation using the extracted feature vector, a situation analysis module pre-processing the sound information received from the emergency bell device to extract the feature vector and classifying at least one key sound source using the trained classifier for the extracted feature vector, and a prediction module predicting the situation analysis result for a crime situation derived based on the classified key sound sources.

According to an embodiment of the disclosure, the artificial intelligence-based sound analysis algorithm may further include a code classification module classifying the situation analysis result predicted by the prediction module into a crime code of a preset security level, setting a different dispatch time, responding personnel, and situation response behavior information depending on the classified crime code, and providing the on-site dispatch information or the situation response information.

According to an embodiment of the disclosure, a method for controlling an emergency bell based on sound, by an emergency bell control system using a sound-based emergency bell comprises, if an emergency bell operation signal is detected from an emergency bell device installed in a preset crime area, receiving sound information generated in the crime area, classifying per-time key sound sources in the received sound information and providing a situation analysis result for whether a crime occurs using the classified per-time key sound sources, and providing on-site dispatch information or situation response information to a security terminal in charge of the crime area based on the situation analysis result.

According to an embodiment of the disclosure, the method may further comprise performing an artificial intelligence-based sound analysis algorithm that extracts an effective feature including a correlation in a time-frequency domain for the sound information having time series characteristics, classifies at least one key sound source based on the extracted effective feature using a convolutional neural network (CNN), and predicts the situation analysis result for the on-site situation using the classified key sound sources.

According to an embodiment of the disclosure, the artificial intelligence-based sound analysis algorithm may further include a data gathering step gathering a number of sample sound sources for each crime situation and stores them as a dataset for training, a training step pre-processing the sample sound sources, extracting an auditory characteristic, as a feature vector, from the pre-processed data, and generating and training a classifier for classifying the key sound sources for each crime situation using the extracted feature vector, a situation analysis step pre-processing the sound information received from the emergency bell device to extract the feature vector and classifying at least one key sound source using the trained classifier for the extracted feature vector, and a prediction step predicting the situation analysis result for a crime situation derived based on the classified key sound sources.

According to an embodiment of the disclosure, the artificial intelligence-based sound analysis algorithm may further include a code classification step classifying the situation analysis result predicted by the prediction step into a crime code of a preset security level, setting a different dispatch time, responding personnel, and situation response behavior information depending on the classified crime code, and providing the on-site dispatch information or the situation response information.

According to an embodiment of the disclosure, there is provided an analysis server analyzing sound information in conjunction with a sound-based emergency bell device. The analysis server. The analysis server receives, in real-time, the sound information from the emergency bell device if an emergency bell operation signal is received from the emergency bell device, classifies per-time key sound sources in the sound information, and provides a situation analysis result on whether a crime occurs using the classified per-time key sound sources. The analysis server transmits on-site dispatch information or situation response information to a security terminal in charge of a crime area, where the emergency bell operation signal occurs, in conjunction with a control server in charge of the crime area, based on the situation analysis result. The artificial intelligence-based sound analysis algorithm may extract an effective feature including a correlation in a time-frequency domain for the sound information having time series characteristics, classify at least one key sound source based on the extracted effective feature using a convolutional neural network (CNN), and predict the situation analysis result for the on-site situation using the classified key sound sources.

According to various embodiments of the disclosure, the method and system of the disclosure may be applied to all conventional emergency bell devices and allow for classification of the crime situation when the emergency bell is operated based on sound information and effective response suited for the classified crime situation, thus allowing for reliable emergency bell and security or anti-crime services.

Further, as the emergency bell device and the camera device may be used together, it is possible to minimize waste of costs due to unnecessary dispatch while allowing for quick response at the site.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein:

FIG. 8 is a view illustrating crime codes classified for each crime situation according to an embodiment of the disclosure;

DETAILED DESCRIPTION

Figure 1:
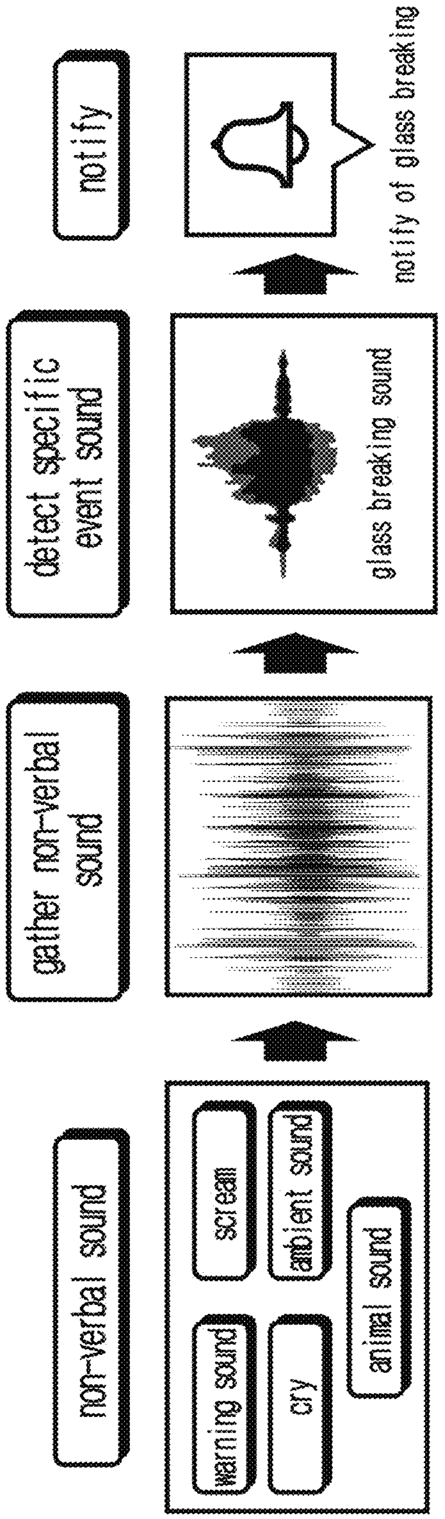
FIG. 1 is a flowchart illustrating a method for recognizing a crime situation based on sound according to the prior art.
Figure 2:
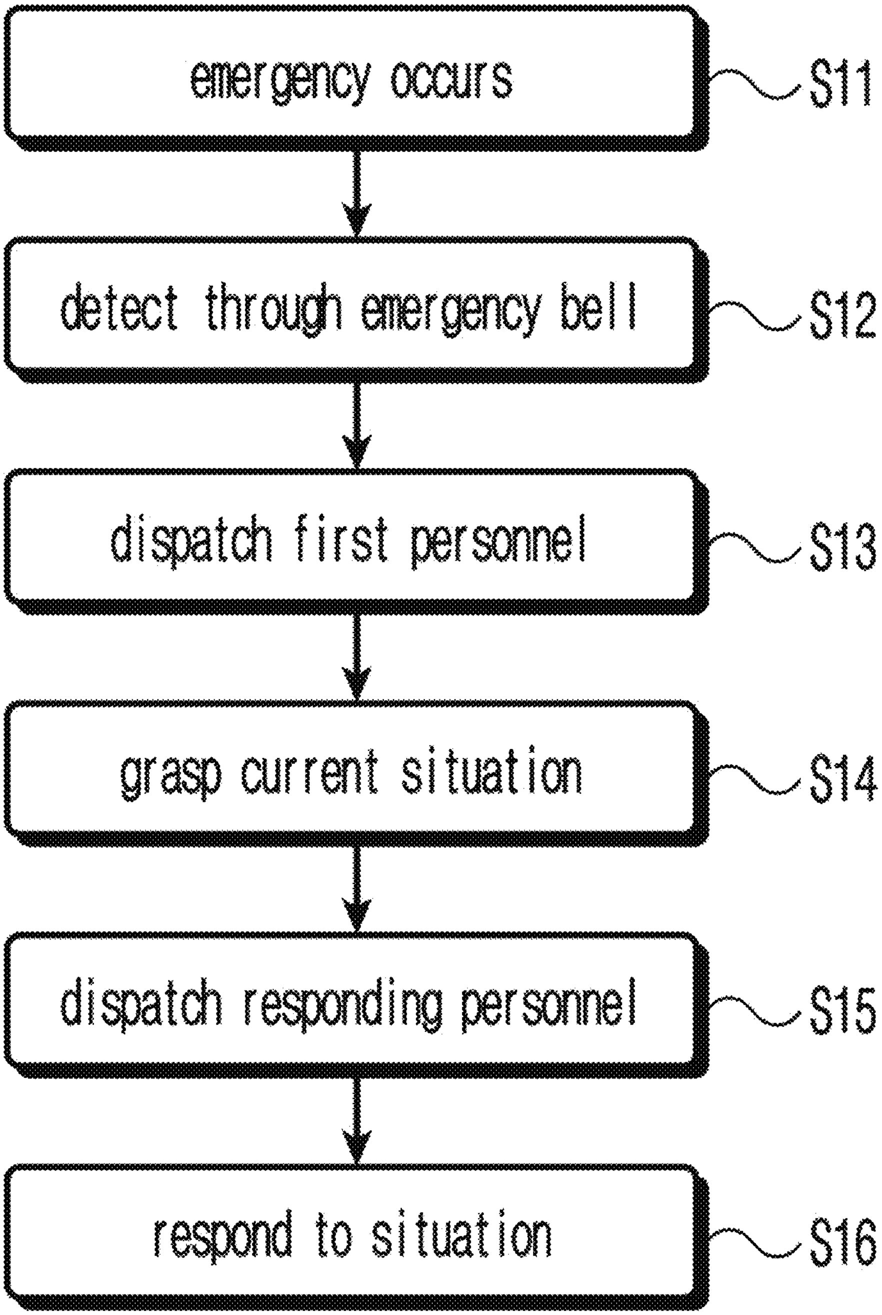
FIG. 2 is a flowchart illustrating a crime response process based on an emergency bell device according to the prior art.

Hereinafter, exemplary embodiments of the inventive concept will be described in detail with reference to the accompanying drawings. The inventive concept, however, may be modified in various different ways, and should not be construed as limited to the embodiments set forth herein. Like reference denotations may be used to refer to the same or similar elements throughout the specification and the drawings. However, the disclosure may be implemented in other various forms and is not limited to the embodiments set forth herein. For clarity of the disclosure, irrelevant parts are removed from the drawings, and similar reference denotations are used to refer to similar elements throughout the specification.

In embodiments of the disclosure, when an element is "connected" with another element, the element may be "directly connected" with the other element, or the element may be "electrically connected" with the other element via an intervening element. When an element "comprises" or "includes" another element, the element may further include, but rather than excluding, the other element, and the terms "comprise" and "include" should be appreciated as not excluding the possibility of presence or adding one or more features, numbers, steps, operations, elements, parts, or combinations thereof.

In the disclosure, the term 'terminal' or 'terminal device' may refer to a wireless communication device with portability and mobility, and may be any kind of handheld wireless communication device, such as a smart phone, a tablet PC, or a laptop computer. The term 'terminal' or 'terminal device' may refer to a wired communication device, such as a personal computer (PC) that may access other terminals or servers using a network. Here, the network means a connection structure capable of exchanging information between nodes, such as a plurality of terminals or servers, and examples of the network include local area networks (LANs), wide area networks (WANs), internet (world wide web (WWW)), wired/wireless data communication networks, telephony networks, or wired/wireless television communication networks.

Examples of wireless data communication networks may include, but are not limited to, 3G, 4G, 5G, 3rd generation partnership project (3GPP), long term evolution (LTE), world interoperability for microwave access (WIMAX), Wi-Fi, Bluetooth communication, infrared communication, ultrasound communication, visible light communication (VLC), and Li-Fi.

Example embodiments are described below for a better understanding of the disclosure, but the disclosure is not limited thereto. Therefore, it should be noted that any embodiment performing substantially the same function as the embodiments disclosed herein belong to the scope of the disclosure.

The components, processes, steps, or methods according to embodiments of the disclosure may be shared as long as they do not technically conflict with each other.

Hereinafter, embodiments of the disclosure are described in detail with reference to the accompanying drawings.

Figure 3:
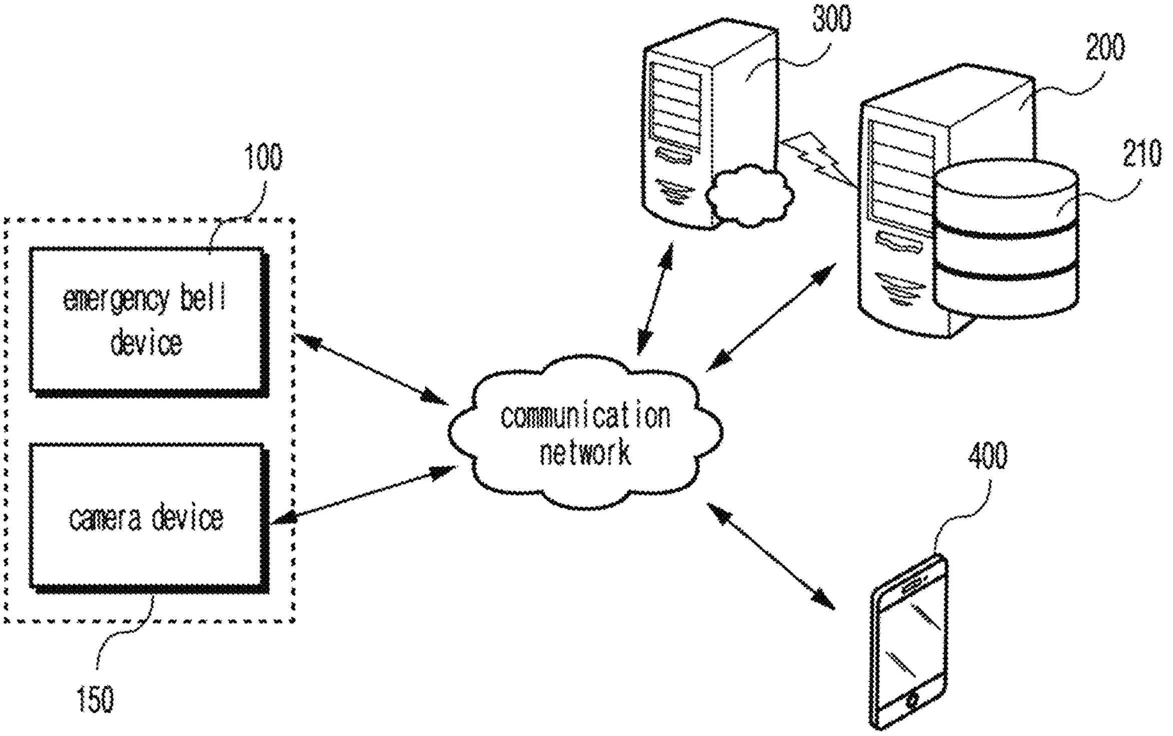
FIG. 3 is a view illustrating a configuration of a sound-based emergency bell control system according to an embodiment of the disclosure.
Figure 4:
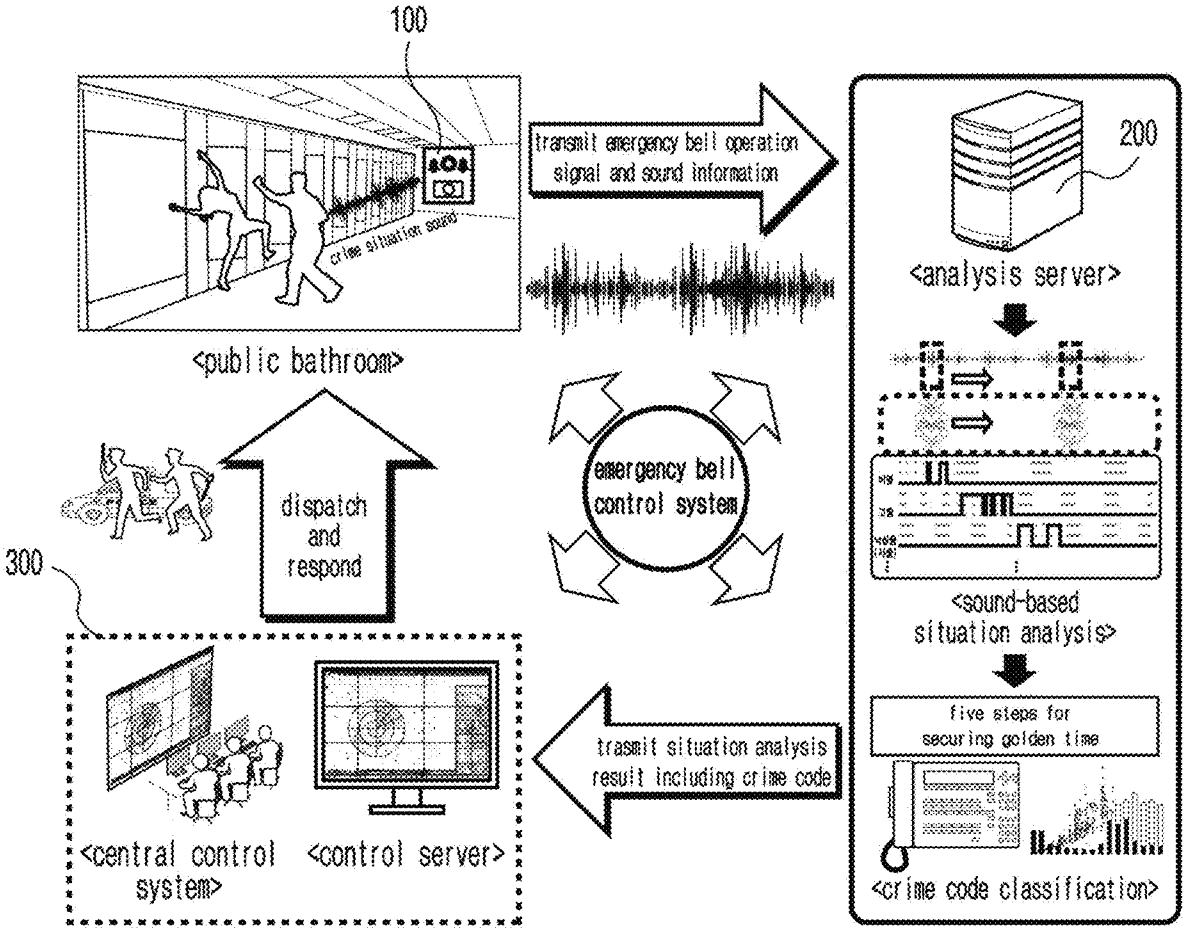
FIG. 4 is a view illustrating operations of components of a sound-based emergency bell control system according to an embodiment of the disclosure.

FIG. 3 is a view illustrating a configuration of a sound-based emergency bell control system according to an embodiment of the disclosure. FIG. 4 is a view illustrating operations of components of a sound-based emergency bell control system according to an embodiment of the disclosure.

Referring to FIGS. 3 and 4, according to an embodiment of the disclosure, the sound-based emergency bell control system includes an emergency bell device 100, an analysis server 200, and a control server 300.

The emergency bell device 100 is installed in each crime area, gathers sound information generated in the crime area, detects an emergency event from the gathered sound information, and generates an emergency bell operation signal. The emergency bell device 100 may include both a button-type emergency bell and a sound recognition emergency bell including a sound recognition module.

The emergency bell device 100 may include a microphone (not shown) for gathering sound, a communication module (not shown) for transmitting the emergency bell operation signal and sound information to the analysis server 200, a memory (not shown), a warning device (not shown) for generating a warning sound when damage or forced power-off occurs, and a control module (not shown).

The emergency bell device 100 stores, in a buffer (not shown), all sound information generated in the crime area (e.g., a public bathroom or bus stop) every predetermined time (about every 10 seconds) and, if an emergency event occurs, generates an emergency bell operation signal. The emergency bell device 100 fetches the sound information, which has been recorded for a predetermined time before the emergency bell operation signal is generated, from the buffer and transmits the sound information and the emergency bell operation signal to the analysis server 200. In this case, the emergency bell device 100 may secure a storage capacity of more than a preset capacity by deleting the sound information stored in the buffer in a first-in-first-out manner.

If the emergency bell operation signal is received from the emergency bell device 100, the analysis server 200 may receive, in real time, the sound information from the emergency bell device 100, classifies per-time key sound sources in the sound information, and provides the result of situation analysis on whether a crime has occurred using the classified per-time key sound sources, to the control server 300. In this case, since the analysis server 200 may also receive and analyze the sound information recorded for a predetermined time before the emergency bell operation signal is generated, the analysis server 200 may more accurately grasp the current situation.

If the situation analysis result is received from the analysis server 200, the control server 300 provides on-site dispatch information or situation response information to a security terminal 400 in charge of the crime area, where the emergency bell operation signal has occurred, based on the situation analysis result.

The analysis server 200 and the control server 300 may be common server computers or may be other various types of devices that may function as servers. For example, the analysis server 200 and the control server 300 each may be implemented in a computing device including a communication module (not shown), a memory (not shown), a processor (not shown) and a database (not shown) and may be implemented as, e.g., a mobile phone, TV, personal digital assistant (PDA), tablet PC, personal computer (PC), notebook PC, and other user terminal devices.

Further, the security terminal 400 is a terminal capable of wireless communication in connection with the police station or other organizations to notify whether to dispatch security guards or of the crime situation and may be implemented as a smartphone, tablet PC, PC, notebook PC, etc.

The emergency bell device 100 has unique identification information designated by the control server 300. The emergency bell operation signal and the situation analysis result include the identification information for the emergency bell device 100. Therefore, the analysis server 200 and the control server 300 may identify the crime area using the identification information for the emergency bell device 100 and may quickly transmit the information to the security terminal 400 in charge of the crime area.

Accordingly, the analysis server 200 and the control server 300 store, in the database 210, the identification information for each emergency bell device 100 and the information for the security terminal 400 in charge of each crime area.

The emergency bell device 100 may further include at least one or more camera devices 150 for capturing or recording the crime area For example, if the crime area is a bus stop, an underground sidewalk, a building rooftop or a building staircase, a camera device 150, such as a CCTV, may be installed on an upper side of an underground sidewalk, a building rooftop or a staircase to capture or record the on-site situation.

If the situation analysis result is received, the control server 300 receives the on-site image in real time using the camera device 150 in the crime area. The control server 300 may classify the current situation into a preset security level while identifying the on-site image based on the situation analysis result and may generate on-site dispatch information or situation response information according to the classified security level. In this case, the control server 300 may change the security level from time to time according to the real-time received on-site image.

As illustrated in FIG. 4, in a case where the emergency bell device 100 is installed in a public bathroom, if the emergency bell device 100 detects a crime situation sound, the emergency bell device 100 transmits, in real-time, an emergency bell operation signal and sound information currently generated in the public bathroom to the analysis server 200.

The analysis server 200 analyzes the on-site situation based on the sound information received from the emergency bell device 100, classifies the on-site situation into a crime code, and transmits the crime code and the situation analysis result for the on-site situation to the control server 300.

The control server 300 allows security personnel to be dispatched to the public bathroom with the emergency bell device 100 to deal with the on-site situation in conjunction with a central control system capable of providing an emergency alarm to the police, fire station, medical institution, or private crime prevention company, etc., based on the situation analysis result.

Figure 5:
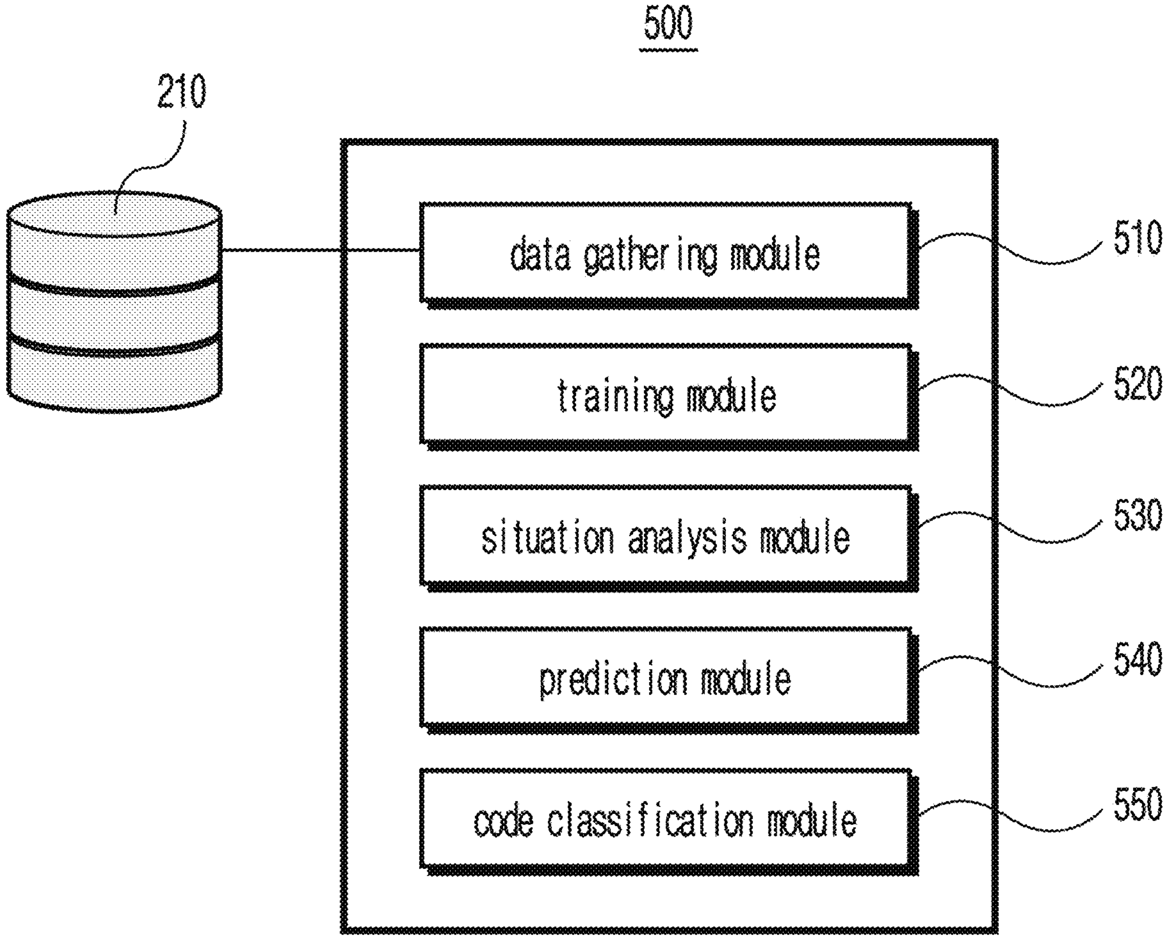
FIG. 5 is a view illustrating an artificial intelligence-based sound analysis algorithm performed by an analysis server according to an embodiment of the disclosure.
Figure 6:
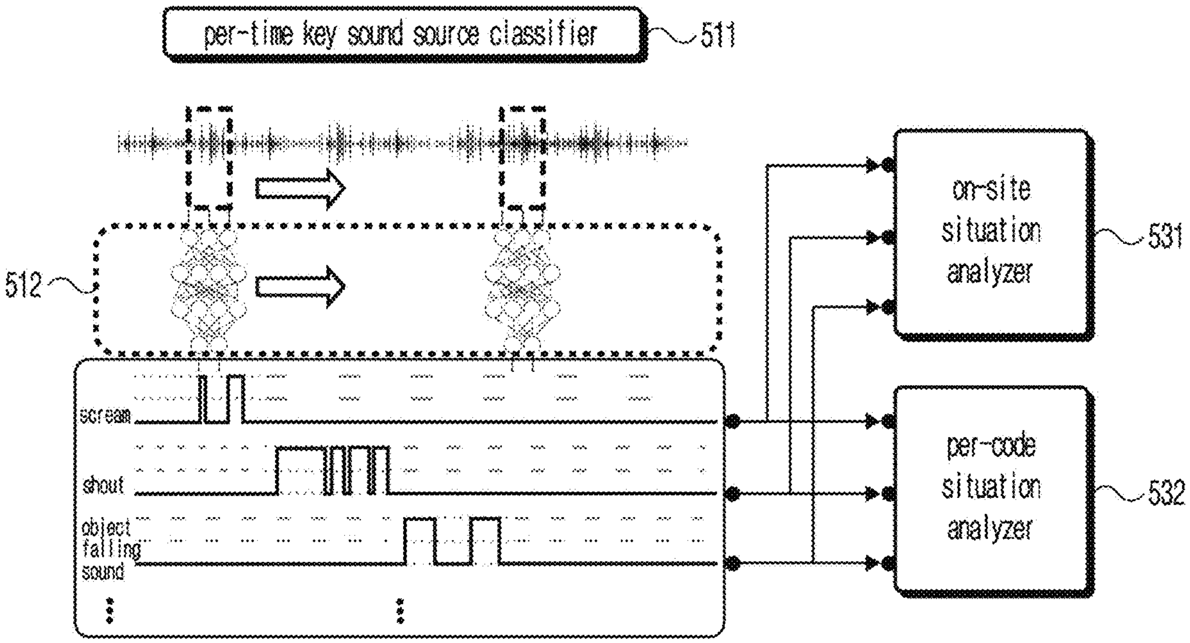
FIG. 6 is a view illustrating a configuration of a CNN applied to FIG. 5.

FIG. 5 is a view illustrating an artificial intelligence-based sound analysis algorithm performed by an analysis server according to an embodiment of the disclosure. FIG. 6 is a view illustrating a configuration of a CNN applied to FIG. 5.

The artificial intelligence-based sound analysis algorithm 500 extracts an effective feature vector including a correlation in the time-frequency domain for sound information having time series characteristics, generates a classifier by training a (training) model for classifying at least one or more key sound source based on the extracted effective feature vector using a convolutional neural network (CNN), and predicts the situation analysis result for the on-site situation using the generated classifier.

The artificial intelligence-based sound analysis algorithm 500 may include, but is not limited to, a data gathering module 510, a training module 520, a situation analysis module 530, a prediction module 540, and a code classification module 550.

The data gathering module 510 gathers a plurality of sample sound sources for each crime situation and stores them, as a training dataset, in the database 210.

The training module 520 may perform pre-processing on the sample sound sources, extract auditory characteristics, as feature vectors, from pre-processed training data, and train the model for classifying key sound sources for each crime situation using the extracted feature vectors.

If the sound information is received from the emergency bell device 100, the situation analysis module 530 may pre-process the received sound information to extract the feature vector and classify at least one or more key sound sources using the classifier generated for the extracted feature vector.

The prediction module 540 predicts the crime situation and the situation analysis result based on the classified key sound sources.

The code classification module 550 may classify the situation analysis result predicted by the prediction module 540 as a crime code of a preset security level, set a different dispatch time, response personnel, and situation response behavior information depending on the classified crime code, and provides the on-site dispatch information or situation response information.

The above-described modules are merely an embodiment for describing the disclosure and, without being limited thereto, various changes or modifications may be made thereto. Further, the above-described modules are stored in the memory as a computer-readable recording medium that may be controlled by the analysis server 200. At least part of the algorithm 500 may be implemented in software, firmware, hardware, or a combination of at least two or more thereof and may include a module, program, routine, command set, or process for performing one or more functions.

The artificial intelligence-based sound analysis algorithm 500 may apply a convolutional neural network (CNN) to the training module 520 and the situation analysis module 530 but in addition to CNN, may adopt other various algorithms, such as recurrent neural network (RNN), YOLO (You Only Look Once), Single Shot Detector (SSD), etc.

The CNN includes an input layer, an output layer, and several hidden layers between the input layer and the output layer, and each layer performs calculations that change data to learn features that only the corresponding data has, and the layers that may be used may include a convolutional, activation/rectified linear unit (ReLU), and pooling layer.

The convolutional layer passes the input data through the convolution filter set activating a specific feature in each sound data. The ReLU layer maps negative values to 0 and maintains positive values to enable faster and more effective learning. This process is also called activation because only activated features are transferred to the next layer. The pooling layer simplifies the output by performing nonlinear downsampling and reducing the number of parameters to be learned by the network.

This CNN analyzes pattern characteristics of sound data using the training dataset provided from the training module 520 and extracts a feature vector for classifying different patterns. Further, the CNN classifies and recognizes which pattern the sound information newly provided by the situation analysis module 530 corresponds to. The pre-processing and feature extraction process are performed in the same manner as in the training module 520, but the situation analysis module 530 may predict the final analysis result using the classifier generated for the extracted feature vector.

The artificial intelligence-based sound analysis algorithm 500 may extract effective feature vectors from sound information using various algorithms. For example, the artificial intelligence-based sound analysis algorithm 500 may extract sound features using, e.g., a short-time Fourier transform (STFT) algorithm, a sound map (feature vector) containing a local correlation in the time-frequency domain in the sound information, or widely used mel-frequency cepstrum coefficients (MFCC).

For example, the artificial intelligence-based sound analysis algorithm 500 may extract the sound source from the sound information in each preset unit time (about 1 second), convert it into a spectrogram, and extract a spectrogram-based feature vector using the CNN. The artificial intelligence-based sound analysis algorithm 500 may classify key sound sources by time by repeating this process while moving in each predetermined time unit.

Alternatively, the artificial intelligence-based sound analysis algorithm 500 may set the unit time to about 10 seconds and perform key sound source classification and sound event analysis according to time in the given unit time.

Figure 7:
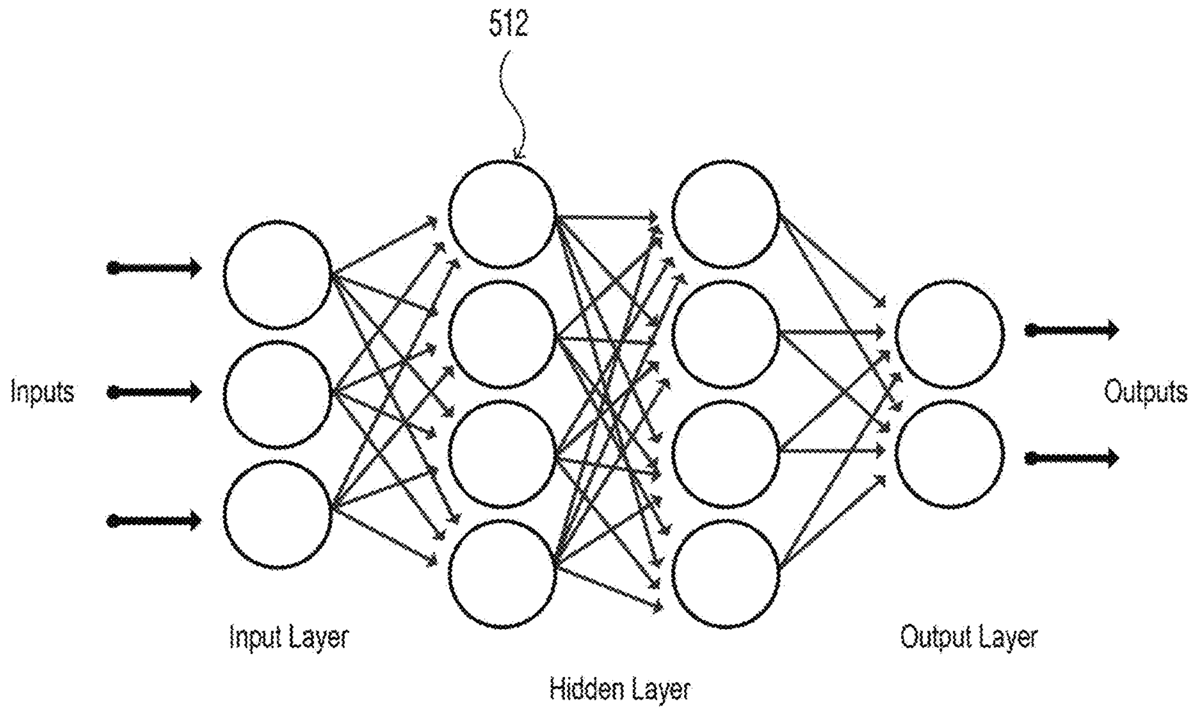
FIG. 7 is a view illustrating a process of deriving a result of situation analysis by an artificial intelligence-based sound analysis algorithm according to an embodiment of the disclosure.

FIG. 7 is a view illustrating a process of deriving a result of situation analysis by an artificial intelligence-based sound analysis algorithm according to an embodiment of the disclosure. FIG. 8 is a view illustrating crime codes classified for each crime situation according to an embodiment of the disclosure.

Referring to FIG. 7, if sound information is received, the artificial intelligence-based sound analysis algorithm 500 may extract a feature vector from the sound information and classify key sound sources using the classifier 511 generated for the extracted feature vector.

In this case, the key sound sources may include one or more sound sources, such as screams, shouts, sounds of falling objects, male voices (especially in women's restrooms), threatening voices, sobbing sounds, moaning sounds, or assault sounds. Accordingly, an on-site situation analyzer 531 included in the situation analysis module 530 identifies what kind of crime situation the site is in based on the key sound sources gathered for each crime situation by the data gathering module 510. A per-code situation analyzer 532 classifies crime codes into codes 0 to 4 according to crime situations.

Referring to FIG. 8, the criminal codes may be divided into five security levels (code 0 to code 4), and it may be shown that from code 4 to code 0, dispatch time, dispatch personnel, and severity of situation response increase. For example, in a case where the emergency bell device 100 is installed in a public bathroom, if a female scream is detected in the public bathroom together with an emergency bell operation signal, the analysis server 200 may classify the crime code as code 0 and transmits, to the control server 300, the crime code and the situation analysis result for the crime situation (e.g., a situation where a man enters the women's bathroom, a victim is sobbing at the threat, or is assaulted). The control server 300 identifies that the crime code is code 0 from the situation analysis result and dispatches security personnel, such as custodians, within the shortest time. Further, for the safety of the victim and the rapid arrest of the offender, the control server 300 may provide the on-site dispatch information or situation response information to dispatch elements, such as ambulances, female police officers, and police personnel in adjacent areas, for cooperation of the dispatch elements.

Figure 9:
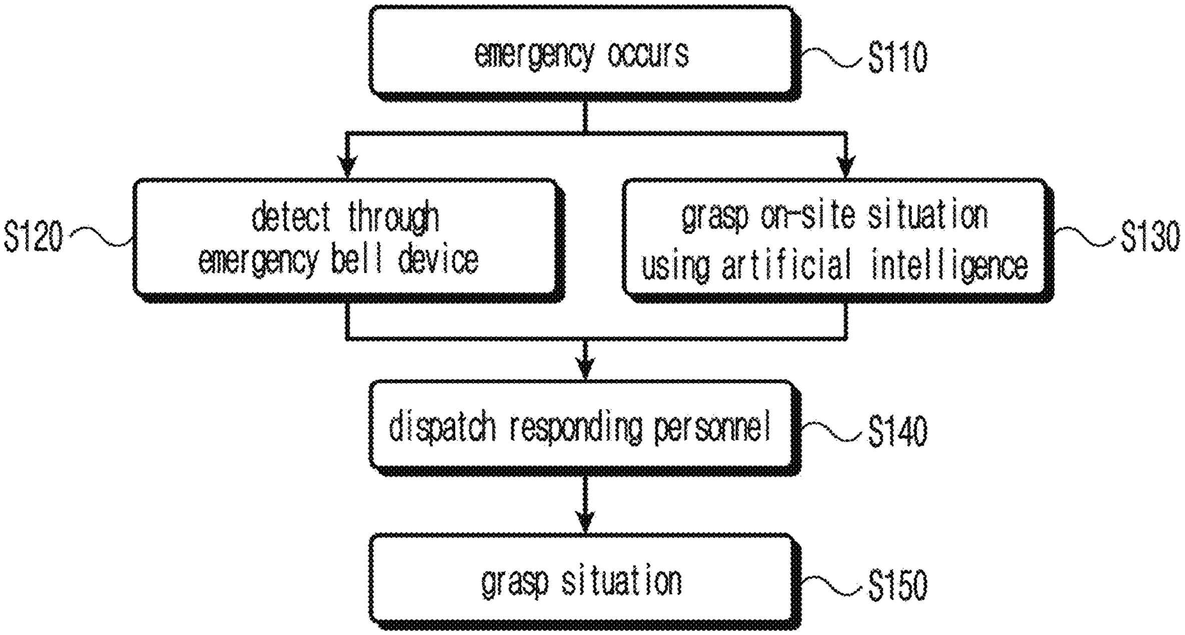
FIG. 9 is a flowchart illustrating a sound-based emergency bell control method according to an embodiment of the disclosure.
Figure 10:
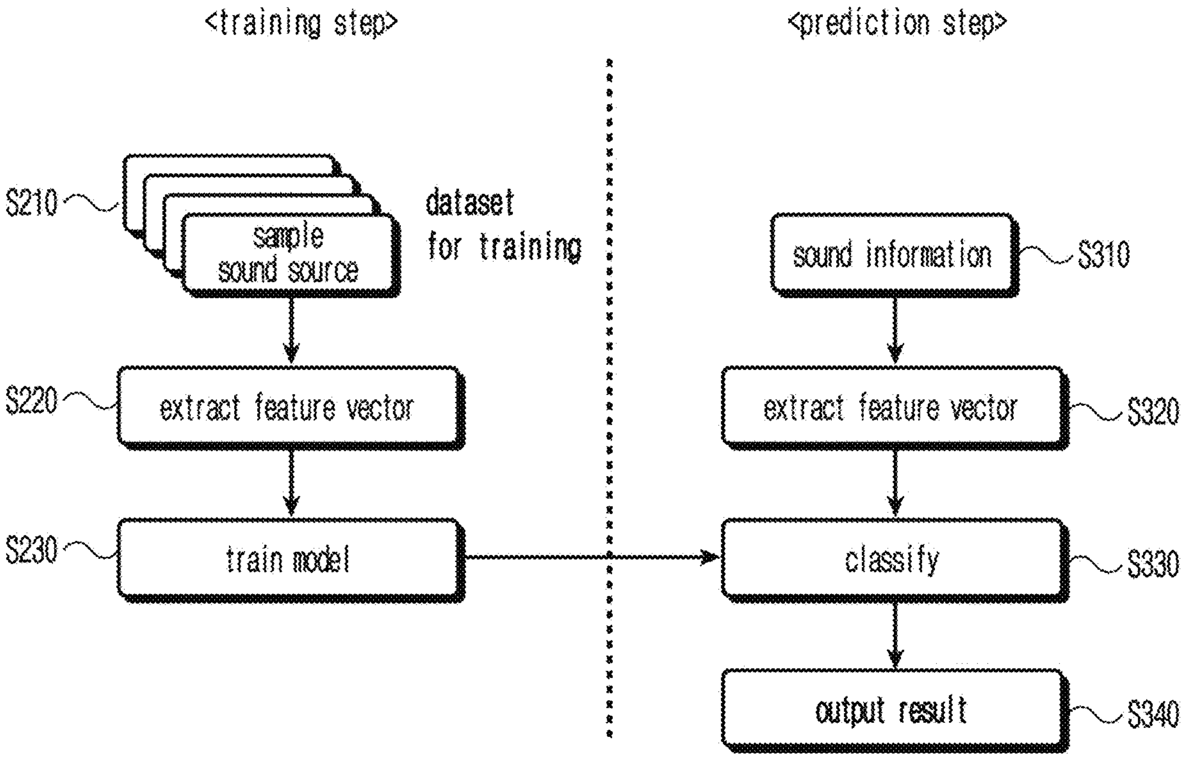
FIG. 10 is a flowchart illustrating a process of deriving a result of situation analysis based on artificial intelligence, in a sound-based emergency bell control method according to an embodiment of the disclosure.

FIG. 9 is a flowchart illustrating a sound-based emergency bell control method according to an embodiment of the disclosure. FIG. 10 is a flowchart illustrating a process of deriving a result of situation analysis based on artificial intelligence, in a sound-based emergency bell control method according to an embodiment of the disclosure.

Referring to FIG. 9, in a sound-based emergency bell control method, if an emergency occurs in a crime area where the emergency bell device 100 is installed (S110), the emergency bell device 100 detects sound information, such as screams, shouts, moans, breaking sounds, or falling sounds, and generates an emergency bell operation signal.

If the emergency bell operation signal is detected, the analysis server 200 receives the sound information from the emergency bell device 100 (S120) and grasps the on-site situation through an artificial intelligence-based sound analysis algorithm based on the received sound information (S130).

Referring to FIG. 10, the analysis server 200 performs a training process and a prediction process using the artificial intelligence-based sound analysis algorithm.

In the training process, the analysis server 200 gathers sample sound sources for each crime situation in association with web crawling or the national police agency, configures a dataset for training (S210), and performs pre-processing on the sample sound sources and extracts a feature vector (S220). The analysis server 200 generates a classifier by training a model for classifying key sound sources for each crime situation based on the extracted feature vector (S230).

In the prediction process, if the sound information is received from the emergency bell device 100 (S310), the CNN extracts the feature vector from the sound information (S320), classifies at least one or more cores using the classifier trained for the extracted feature vector (S330), and grasps the crime situation using the classified key sound sources and outputs the situation analysis result (S340).

Referring back to FIG. 9, the analysis server 200 classifies the crime code according to the on-site situation and transmits the situation analysis result including the classified crime code, the crime situation, and the identification information for the emergency bell device 100 to the control server 300.

The control server 300 analyzes the situation analysis result, generates on-site dispatch information and situation response information for dispatching responding personnel to the site according to the crime code, and transmits it to the security terminal 400 (S140). Through the security terminal 400 that receives the on-site dispatch information and situation response information, the security agent identifies the crime area based on the identification information for the emergency bell device 100 and moves to the crime area and responds to the situation (S150).

The steps of FIGS. 9 and 10 may be divided into additional sub-steps or may be combined into fewer steps according to embodiments of the disclosure. Further, some of the steps may be omitted as necessary, or the order of the steps may be changed.

The above-described sound-based emergency bell control method according to various embodiments may be implemented in the form of recording media including computer-executable instructions, such as program modules. The computer-readable medium may be an available medium that is accessible by a computer. The computer-readable storage medium may include a volatile medium, a non-volatile medium, a separable medium, and/or an inseparable medium. The computer-readable storage medium may include a computer storage medium. The computer storage medium may include a volatile medium, a non-volatile medium, a separable medium, and/or an inseparable medium that is implemented in any method or scheme to store computer-readable commands, data architecture, program modules, or other data or information.

Although embodiments of the disclosure have been described with reference to the accompanying drawings, it will be appreciated by one of ordinary skill in the art that the disclosure may be implemented in other various specific forms without changing the essence or technical spirit of the disclosure. Thus, it should be noted that the above-described embodiments are provided as examples and should not be interpreted as limiting. Each of the components may be separated into two or more units or modules to perform its function(s) or operation(s), and two or more of the components may be integrated into a single unit or module to perform their functions or operations.

It should be noted that the scope of the disclosure is defined by the appended claims rather than the described description of the embodiments and include all modifications or changes made to the claims or equivalents of the claims.

What is claimed is:

1. A system for controlling an emergency bell based on sound, the system comprising:

an emergency bell device installed in a crime area, gathering sound information generated in the crime area, detecting an emergency event from the gathered sound information, and generating an emergency bell operation signal;

an analysis server receiving, in real-time, the sound information from the emergency bell device if the emergency bell operation signal is received, classifying per-time key sound sources in the sound information, and providing a situation analysis result on whether a crime occurs using the classified per-time key sound sources; and a control server receiving the situation analysis result and providing on-site dispatch information or situation response information to a security terminal in charge of the crime area based on the received situation analysis result, wherein the analysis server performs an artificial intelligence-based sound analysis algorithm that extracts an effective feature including a correlation in a time-frequency domain for the sound information having time series characteristics, classifies at least one key sound source based on the extracted effective feature using a convolutional neural network (CNN), and predicts the situation analysis result for the on-site situation using the classified key sound sources, wherein the artificial intelligence-based sound analysis algorithm includes:

a data gathering module gathering a number of sample sound sources for each crime situation and stores them as a dataset for training;

a training module pre-processing the sample sound sources, extracting an auditory characteristic, as a feature vector, from the pre-processed data, and generating and training a classifier for classifying the key sound sources for each crime situation using the extracted feature vector;

a situation analysis module pre-processing the sound information received from the emergency bell device to extract the feature vector and classifying at least one key sound source using the trained classifier for the extracted feature vector;

a prediction module predicting the situation analysis result for a crime situation derived based on the classified key sound sources; and a code classification module classifying the situation analysis result predicted by the prediction module into a crime code of a preset security level, setting a different dispatch time, responding personnel, and situation response behavior information depending on the classified crime code, and providing the on-site dispatch information or the situation response information.

2. The system of claim 1, wherein the emergency bell device has unique identification information designated by the control server, and wherein the emergency bell operation signal and the situation analysis result include the identification information for the emergency bell device.

3. The system of claim 2, wherein the analysis server stores information for the security terminal, and wherein the analysis server fetches the information for the security terminal using the identification information for the emergency bell device included in the situation analysis result and transmits the on-site dispatch information or the situation response information.

4. The system of claim 1, wherein the emergency bell device includes at least one camera device capturing an on-site image of the crime area, and wherein the control server classifies the on-site situation into a preset security level for each time using the captured on-site image received through the camera device and the situation analysis result and generates the on-site dispatch information or the situation response information according to the classified security level.

5. A method for controlling an emergency bell based on sound, by an emergency bell control system using a sound-based emergency bell, the method comprising:

if an emergency bell operation signal is detected from an emergency bell device installed in a preset crime area, receiving sound information generated in the crime area;

classifying per-time key sound sources in the received sound information and providing a situation analysis result for whether a crime occurs using the classified per-time key sound sources;

providing on-site dispatch information or situation response information to a security terminal in charge of the crime area based on the situation analysis result; and performing an artificial intelligence-based sound analysis algorithm that extracts an effective feature including a correlation in a time-frequency domain for the sound information having time series characteristics, classifies at least one key sound source based on the extracted effective feature using a convolutional neural network (CNN), and predicts the situation analysis result for the on-site situation using the classified key sound sources, wherein the artificial intelligence-based sound analysis algorithm further includes:

a data gathering step gathering a number of sample sound sources for each crime situation and stores them as a dataset for training;

a training step pre-processing the sample sound sources, extracting an auditory characteristic, as a feature vector, from the pre-processed data, and generating and training a classifier for classifying the key sound sources for each crime situation using the extracted feature vector;

a situation analysis step pre-processing the sound information received from the emergency bell device to extract the feature vector and classifying at least one key sound source using the trained classifier for the extracted feature vector; and a prediction step predicting the situation analysis result for a crime situation derived based on the classified key sound sources, wherein the artificial intelligence-based sound analysis algorithm further includes a code classification step classifying the situation analysis result predicted by the prediction step into a crime code of a preset security level, setting a different dispatch time, responding personnel, and situation response behavior information depending on the classified crime code, and providing the on-site dispatch information or the situation response information.

6. An analysis server analyzing sound information in conjunction with a sound-based emergency bell device, wherein the analysis server receives, in real-time, the sound information from the emergency bell device if an emergency bell operation signal is received from the emergency bell device, classifies per-time key sound sources in the sound information through an artificial intelligence-based sound analysis algorithm, and provides a situation analysis result on whether a crime occurs using the classified per-time key sound sources, wherein the analysis server transmits on-site dispatch information or situation response information to a security terminal in charge of a crime area, where the emergency bell operation signal occurs, in conjunction with a control server in charge of the crime area, based on the situation analysis result, and wherein the artificial intelligence-based sound analysis algorithm extracts an effective feature including a correlation in a time-frequency domain for the sound information having time series characteristics, classifies at least one key sound source based on the extracted effective feature using a convolutional neural network (CNN), and predicts the situation analysis result for the on-site situation using the classified key sound sources, wherein the artificial intelligence-based sound analysis algorithm includes:

a data gathering module gathering a number of sample sound sources for each crime situation and stores them as a dataset for training;

a training module pre-processing the sample sound sources, extracting an auditory characteristic, as a feature vector, from the pre-processed data, and generating and training a classifier for classifying the key sound sources for each crime situation using the extracted feature vector;

a situation analysis module pre-processing the sound information received from the emergency bell device to extract the feature vector and classifying at least one key sound source using the trained classifier for the extracted feature vector;

a prediction module predicting the situation analysis result for a crime situation derived based on the classified key sound sources; and a code classification module classifying the situation analysis result predicted by the prediction module into a crime code of a preset security level, setting a different dispatch time, responding personnel, and situation response behavior information depending on the classified crime code, and providing the on-site dispatch information or the situation response information.

* * * * *